US011971673B2

(12) United States Patent
Ichikawa et al.

(10) Patent No.: US 11,971,673 B2
(45) Date of Patent: Apr. 30, 2024

(54) IMAGE FORMING APPARATUS

(71) Applicant: Brother Kogyo Kabushiki Kaisha, Nagoya (JP)

(72) Inventors: Tomoya Ichikawa, Nagoya (JP); Tomoya Yamamoto, Kasugai (JP); Ryosuke Sakai, Nagoya (JP); Kentaro Mori, Kasugai (JP); Kyoko Sugiyama, Nagoya (JP); Ayaka Ohira, Nagoya (JP); Isami Fujisawa, Gifu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/936,503

(22) Filed: Sep. 29, 2022

(65) Prior Publication Data

US 2023/0026662 A1 Jan. 26, 2023

Related U.S. Application Data

(63) Continuation of application No. PCT/JP2021/012241, filed on Mar. 24, 2021.

(30) Foreign Application Priority Data

Apr. 1, 2020 (JP) ................................ 2020-065603

(51) Int. Cl.
*G03G 15/20* (2006.01)
*G03G 15/00* (2006.01)

(52) U.S. Cl.
CPC ..... *G03G 15/2039* (2013.01); *G03G 15/6555* (2013.01)

(58) Field of Classification Search
CPC ....................... G03G 15/2039; G03G 15/6555
(Continued)

(56) References Cited

U.S. PATENT DOCUMENTS 9,037,065 B2 5/2015 Suzuki
11,199,802 B2 * 12/2021 Mori ..................... B65H 5/062
(Continued)

FOREIGN PATENT DOCUMENTS

JP 2012-145622 A 8/2012
JP 2012-233953 A 11/2012
(Continued)

OTHER PUBLICATIONS

Sep. 29, 2022—(WO) International Preliminary Report on Patentability—App PCT/JP2021/012241.
(Continued)

*Primary Examiner* — Hoan H Tran
(74) *Attorney, Agent, or Firm* — Banner & Witcoff, Ltd.

(57) ABSTRACT

An image forming apparatus includes a process unit, a heating unit, and a controller unit. The process unit is configured to transfer an image onto a sheet. The heating unit is configured to fix the image transferred at the process unit onto the sheet, and to transfer a transfer layer onto an image formed on a sheet overlaid on a multilayer film. The controller unit is capable of operating in a first printing mode in which processes of transferring an image at the process unit, fixing the image at the heating unit, and transferring the transfer layer at the heating unit are executed, and a second printing mode in which processes of transferring an image at the process unit and fixing the image at the heating unit are not executed, and a process of transferring the transfer layer at the heating unit is executed.

31 Claims, 7 Drawing Sheets

(58) Field of Classification Search
USPC .................................................... 399/67, 122
See application file for complete search history.

(56) References Cited

U.S. PATENT DOCUMENTS

| | | | | |
|---|---|---|---|---|
| 11,772,412 | B2 * | 10/2023 | Yamamoto | G03G 15/2032 355/97 |
| 2012/0177417 | A1 | 7/2012 | Fujita et al. | |
| 2013/0279952 | A1 | 10/2013 | Suzuki | |
| 2013/0287455 | A1 | 10/2013 | Suzuki | |
| 2017/0308014 | A1 | 10/2017 | Arai | |
| 2019/0004466 | A1 | 1/2019 | Sakai et al. | |

FOREIGN PATENT DOCUMENTS

| | | | |
|---|---|---|---|
| JP | 2013-237262 | A | 11/2013 |
| JP | 2013-242533 | A | 12/2013 |
| JP | 2017-149026 | A | 8/2017 |
| JP | 2017-156504 | A | 9/2017 |
| JP | 2017-156724 | A | 9/2017 |
| JP | 2017-156725 | A | 9/2017 |
| JP | 2017-156726 | A | 9/2017 |
| JP | 2017-194639 | A | 10/2017 |
| JP | 2018-031921 | A | 3/2018 |
| JP | 2018-062156 | A | 4/2018 |
| JP | 2018-173524 | A | 11/2018 |
| JP | 2018-173525 | A | 11/2018 |
| JP | 2019-020608 | A | 2/2019 |
| JP | 2019-045653 | A | 3/2019 |
| JP | 2019-069554 | A | 5/2019 |

OTHER PUBLICATIONS

Jun. 22, 2022—International Search Report—Intl App PCT/JP2021/012241.
Sep. 29, 2021—(WO) International Preliminary Report on Patentability—App PCT/JP2021/012241.
Jun. 22, 2021—International Search Report—Intl App PCT/JP2021/012241.
Feb. 20, 2024—Notice of Reasons for Refusal—JP App 2020-065603, Eng Tran.

* cited by examiner

FIG.3

| | FIRST HEATING UNIT TARGET TEMPERATURE TT1 | | SECOND HEATING UNIT TARGET TEMPERATURE TT2 | |
|---|---|---|---|---|
| | INITIAL VALUE | PRINTING THICK PAPER | INITIAL VALUE | PRINTING THICK PAPER |
| FIRST PRINTING MODE (FIXING TONER IMAGE +TRANSFERRING TRANSFER LAYER) | 160°C | 170°C | 130°C | 150°C |
| SECOND PRINTING MODE (ONLY TRANSFERRING TRANSFER LAYER) | – | – | 150°C (AFTER CHANGE :170°C) | 170°C (AFTER CHANGE :190°C) |
| THIRD PRINTING MODE (ONLY FIXING TONER IMAGE) | 180°C | 190°C | – | – |

IMAGE FORMING APPARATUS

REFERENCE TO RELATED APPLICATIONS

This application is a continuation application of International Application No. PCT/JP2021/012241 filed on Mar. 24, 2021 which claims priority from Japanese Patent Application No. 2020-065603 filed on Apr. 1, 2020. The disclosures of these applications are incorporated herein by reference in their entirety.

BACKGROUND ART

An image forming apparatus known in the art comprises a process unit for transferring a toner image onto a sheet, a fuser for fixing the toner image transferred at the process unit onto the sheet, and a foil transfer unit for transferring a foil (transfer layer) onto the toner image fixed on the sheet at the fuser.

DESCRIPTION

In such an image forming apparatus, the transfer layer is transferred onto the toner image that has been formed on the sheet at the same image forming apparatus. In other words, the process of forming a toner image on a sheet and the process of transferring a transfer layer onto the toner image are executed in the same image forming apparatus; and it had not been considered to transfer a transfer layer onto a toner image formed on a sheet by another image forming apparatus without the process of forming the toner image on the sheet being executed It would be desirable to provide an image forming apparatus capable of receiving a sheet having a toner image formed thereon and transferring a transfer layer onto the toner image on the sheet without executing a process of forming the toner image on the sheet.

In one aspect, an image forming apparatus disclosed herein has a capability of transferring, from a multilayer film including a transfer layer and a supporting layer that supports the transfer layer, the transfer layer onto an image formed on a sheet. The image forming apparatus comprises a process unit, a heating unit, and a controller unit. The process unit is configured to transfer an image onto a sheet. The heating unit is configured to fix the image transferred at the process unit onto the sheet, and to transfer the transfer layer onto an image formed on a sheet overlaid on the multilayer film. The controller unit is configured to be capable of operating in a first printing mode and a second printing mode. In the first printing mode, processes of transferring an image at the process unit, fixing the image at the heating unit, and transferring the transfer layer at the heating unit are executed. In the second printing mode, processes of transferring an image at the process unit and fixing the image at the heating unit are not executed, and a process of transferring the transfer layer at the heating unit is executed.

According to such configuration, the processes of transferring and fixing an image and transferring the transfer layer onto a sheet can be performed in the first printing mode. Further, the process of transferring the transfer layer onto an image formed on a sheet without executing a process of forming the image on the sheet can be executed in the second printing mode.

The above-described image forming apparatus may further comprising a first conveyance path configured to guide a sheet through the process unit to the heating unit, and the controller unit may be configured to cause a sheet to be guided to the heating unit by the first conveyance path in both of the first printing mode and the second printing mode.

According to such configuration, a common conveyance path can be used which makes it possible to downsize the image forming apparatus.

The above-described image forming apparatus may further comprise a first conveyance path configured to guide a sheet through the process unit to the heating unit, and a second conveyance path connected to the first conveyance path at a location downstream of the process unit in a direction of conveyance of a sheet to guide a sheet to the heating unit by a route not passing through the process unit, and the controller unit may be configured to cause a sheet to be guided to the heating unit by the first conveyance path in the first printing mode, and cause a sheet to be guided to the heating unit by the second conveyance path in the second printing mode.

According to such configuration, since a sheet does not pass through the process unit in the second printing mode where the second conveyance path is used to guide the sheet to the heating unit, the process unit can be kept from being operated.

The above-described image forming apparatus may be configured such that the heating unit comprises a first heating unit configured to fix the image transferred onto the sheet at the process unit, and a second heating unit located downstream of the first heating unit in the direction of conveyance to transfer the transfer layer onto an image on a sheet, and the second conveyance path is connected to the first conveyance path at a location between the first heating unit and the second heating unit in the direction of conveyance.

According to such configuration, since a sheet does not pass through the first heating unit in the second printing mode where the second conveyance path is used to guide the sheet to the heating unit, the first heating unit can be kept from being operated.

The above-described image forming apparatus may be configured such that the heating unit comprises a first heating unit configured to fix the image transferred onto the sheet at the process unit, and a second heating unit located downstream of the first heating unit in a direction of conveyance of a sheet to transfer the transfer layer onto an image on a sheet.

According to such configuration, a fixing condition of an image at the first heating unit and a transfer condition of the transfer layer at the second heating unit can be set individually.

In the above-described image forming apparatus, an amount of heat applied to the image on the sheet by the second heating unit in the first printing mode may be smaller than an amount of heat applied to the image on the sheet by the second heating unit in the second heating mode.

According to such configuration, reliability of transferring the transfer layer on an image on a sheet S can be kept sufficiently high.

The above-described image forming apparatus may be configured such that the controller unit is configured to set a target temperature of the second heating unit in the first printing mode at a temperature lower than a target temperature of the second heating unit in the second printing mode.

According to such configuration, power consumption for operation in the first printing mode can be reduced.

The above-described image forming apparatus may be configured such that when the transfer layer is transferred onto an image formed on a first sheet thicker than a second sheet, the controller unit is configured to cause the second heating unit to apply to the first sheet an amount of heat greater than an amount of heat applied to the second sheet when the transfer layer is transferred onto an image formed on the second sheet.

According to such configuration, an amount of heat necessary for transferring the transfer layer can be ensured even when the sheet is thick and not easily heated up by increasing the amount of heat applied to an image on a sheet by the second heating unit. Thereby, reliability of transferring the transfer layer can be kept sufficiently high.

The above-described image forming apparatus may further comprise an operation unit operable by a user to change an amount of heat to be applied to the image on the sheet by the second heating unit to a first amount of heat or to a second amount of heat greater than the first amount of heat, and the controller unit may be configured, in the second printing mode, to cause the second heating unit to apply the second amount of heat to the image on the sheet, if the amount of heat to be applied to the image on the sheet by the second heating unit is changed to the second amount of heat according to information input at the operation unit.

According to such configuration, reliability of transferring the transfer layer on an image formed on a sheet by another image forming apparatus can be maintained.

The above-described image forming apparatus may be configured such that the controller unit is configured to be capable of operating in a third printing mode in which processes of transferring an image onto a sheet at the process unit and fixing the image onto the sheet at the heating unit are executed, and a process of transferring the transfer layer onto the sheet at the heating unit is not executed.

According to such configuration, an image consisting of an image not having a transfer layer transferred thereon can be formed on a sheet in the third printing mode.

The above-described image forming apparatus may further comprise an operation unit operable by a user to select a printing mode, and the controller unit may be configured to determine the printing mode according to information input at the operation unit.

The above-described image forming apparatus may be configured such that the controller unit is configured to determine a printing mode according to information received from an external device connected to the image forming apparatus when a user operates the external device and selects the printing mode.

In another aspect, the image forming apparatus has a capability of transferring, from a multilayer film including a transfer layer and a supporting layer that supports the transfer layer, the transfer layer onto an image formed on a sheet. The image forming apparatus comprises a process unit, a heating unit, a first conveyance path, and a second conveyance path. The process unit is configured to transfer an image on a sheet. The heating unit is configured to fix the image transferred at the process unit onto the sheet, and to transfer the transfer layer onto an image formed on a sheet overlaid on the multilayer film. The first conveyance path is configured to guide a sheet through the process unit to the heating unit. The second conveyance path is connected to the first conveyance path at a location downstream of the process unit in a direction of conveyance of a sheet to guide a sheet to the heating unit by a route not passing through the process unit.

According to such configuration, a sheet can be guided by the first conveyance path to the heating unit so that an image can be transferred and fixed onto the sheet and the transfer layer can be transferred onto the image. Further, a sheet can be guided by the second conveyance path to the heating unit so that the transfer layer can be transferred onto an image formed on the sheet by another image forming apparatus without a process of forming the image on the sheet being executed. Since the sheet does not pass through the process unit when the transfer layer is transferred onto the sheet using the second conveyance path, the process unit can be kept from operating in this situation.

The above-described image forming apparatus may be configured such that the heating unit comprises a first heating unit configured to fix the image transferred onto the sheet at the process unit, and a second heating unit located downstream of the first heating unit in the direction of conveyance to transfer the transfer layer onto an image on a sheet, and the second conveyance path is connected to the first conveyance path at a location between the first heating unit and the second heating unit in the direction of conveyance.

According to such configuration, since the sheet does not pass through the first heating unit when the transfer layer is transferred onto a sheet using the second conveyance path, the first heating unit can be kept from operating in this situation.

The above and other aspects, their advantages and further features will become more apparent by describing in detail illustrative, non-limiting embodiments thereof with reference to the accompanying drawings briefly described below:

FIG. 3 is a table showing target temperatures of a first heating unit and a second heating unit in each printing mode.

Figure 1:
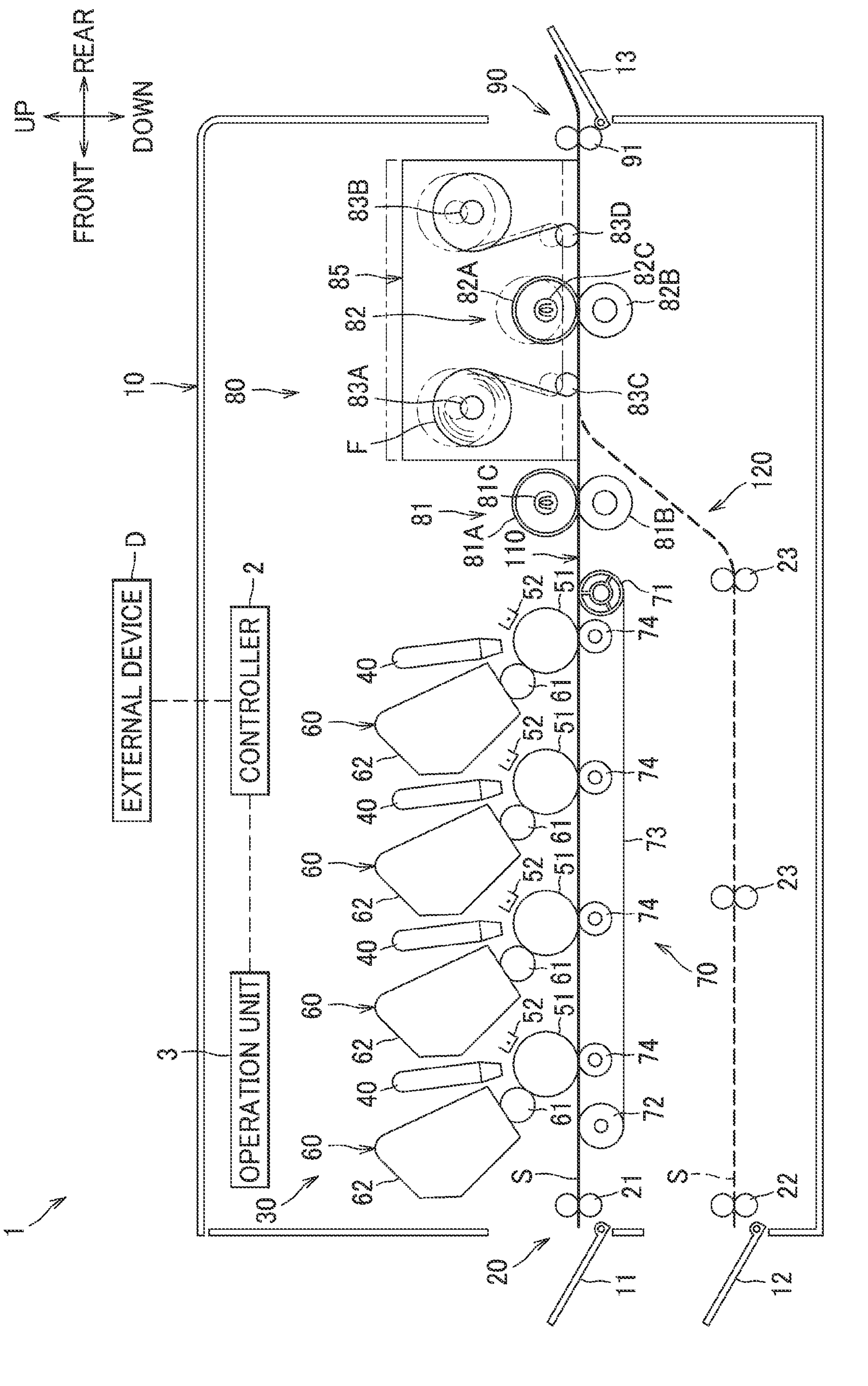
FIG. 1 is an illustration showing a configuration of an image forming apparatus.

As shown in FIG. 1, an image forming apparatus 1 is a device capable of forming a foil image on a sheet S. More specifically, the layer transfer device 1 is a device capable of overlaying a sheet S on a multilayer film F which will be described below, and transferring a transfer layer including foil such as aluminum onto a toner image formed on the sheet S. The image forming apparatus 1 comprises a housing 10, a feeder unit 20, a process unit 30, a heating unit 80, an ejection unit 90, a first conveyance path 110, a second conveyance path 120, an operation unit 3, and a controller 2.

The housing 10 is a member for housing the process unit 30, the heating unit 80, and other components. The housing 10 comprises a first feed tray 11, a second feed tray 12, and an output tray 13. The first feed tray 11 and the second feed tray 12 are trays for holding sheets S. The sheets S on the second feed tray 12 are stacked with their surfaces having toner images formed thereon facing upward. The output tray 13 is a tray for receiving sheets S ejected from the housing 10.

The feeder unit 20 is a unit for feeding a sheet S into the housing 10. The feeder unit 20 comprises a first feeder roller 21, a second feeder roller 22, and conveyor rollers 23. The first feeder roller 21 feeds the sheets S stacked on the first feed tray 11 one by one to the process unit 30. The second feeder roller 22 feeds the sheets S stacked on the second feed tray 12 one by one into the second conveyance path 120 directed to the heating unit 80. The conveyor rollers 23 are provided in the second conveyance path 120, and convey a sheet S fed from the second feeder roller 22 to the heating unit 80.

The process unit 30 is a unit for transferring a toner image onto a sheet S. The process unit 30 comprises exposure units 40, photosensitive drums 51, chargers 52, development units 60 and a transfer unit 70. A plurality of exposure units 40, photosensitive drums 51, chargers 52, and development units 60 are provided, one for each of the four colors of toner of yellow, magenta, cyan, and black.

The plurality of photosensitive drums 51 are arranged in tandem from the front to the rear. In the following description, the left side of FIG. 1 will be referred to as "front", the right side of FIG. 1 will be referred to as "rear", the upper side of FIG. 1 will be referred to as "up (upward)", and the lower side of FIG. 1 will be referred to as "down (downward)"; each element in FIG. 1 is shown as viewed from the "right" side, while the "left" side thereof faces behind.

Each charger 52 is arranged to face a corresponding photosensitive drum 51. The charger 52 is configured to uniformly charge a surface of the photosensitive drum 51.

Each exposure unit 40 is arranged above a corresponding photosensitive drum 51 to face the photosensitive drum 51. Each exposure unit 40 comprises a plurality of LEDs (not shown) on a head portion thereof facing a corresponding photosensitive drum 51. The LEDs are arranged along a direction of a rotation axis of the photosensitive drum 51. The exposure unit 40 causes the LEDs to flash on and off based on image data to thereby expose the surface of the photosensitive drum 51 to light.

Each development unit 60 comprises a developing roller 61 that supplies toner to a corresponding photosensitive drum 51 and a development housing 62 that supports the developing roller 61 in a manner that allows the developing roller 61 to rotate. Each development housing 62 contains toner of yellow, magenta, cyan or black.

The transfer unit 70 is located below the photosensitive drums 51. The transfer unit 70 comprises a drive roller 71, a follower roller 72, an endless transfer belt 73 and a plurality of transfer rollers 74. The conveyor belt 73 is looped around and runs between the drive roller 71 and the follower roller 72. The outside surface of the conveyor belt 73 is positioned to face each photosensitive drum 51. The transfer roller 74 is a member that transfers a toner image formed on the photosensitive drum 51 onto a sheet S. Each transfer roller 74 is positioned inside the conveyor belt 73 to hold the transfer belt 73 in combination with a corresponding photosensitive drum 51. Four transfer rollers 74 are provided.

In the process unit 30, the surface of each photosensitive drum 51 is uniformly charged by a corresponding charger 52 and thereafter exposed to light by a corresponding exposure unit 40. In this way, an electrostatic latent image is formed on the surface of each photosensitive drum 51 based on image data. Further, the process unit 30 causes toner contained in each development housing 62 to be carried on a corresponding development roller 61.

Then, toner carried on the each development roller 61 is supplied to the electrostatic latent image formed on the surface of each photosensitive drum 51. As a result, the electrostatic latent image is visualized and a toner image is formed on the surface of each photosensitive drum 51. Subsequently, the process unit 30 transfers the toner image formed on the surface of each photosensitive drum 51 onto a sheet S as the sheet S fed from the feeder unit 20 onto the conveyor belt 73 is conveyed through between each photosensitive drum 51 and a corresponding transfer roller 74.

The heating unit 80 is a unit for fixing the toner image transferred onto the sheet S at the process unit 30, and for transferring the transfer layer of the multilayer film F onto a toner image on a sheet S. The heating unit 80 comprises a first heating unit 81 and a second heating unit 82.

The first heating unit 81 is a unit for fixing the toner image transferred onto the sheet S at the process unit 30 and is also referred to as a fixing unit or a fuser. The first heating unit 81 comprises a first heating roller 81A, a first pressure roller 81B, and a first heater 81C.

The second heating unit 82 is a unit in which a sheet S is overlaid onto a multilayer film F to transfer the transfer layer of the multilayer film F onto a toner image on the sheet S and is also referred to as a layer transfer unit. The second heating unit 82 is located downstream of the first heating unit 81 in a direction of conveyance of the sheet S from the front to the rear. The second heating unit 82 comprises a second heating roller 82A which is also referred to as a layer transfer roller, a second pressure roller 82B, and a second heater 82C.

The first heating roller 81A and the second heating roller 82A are each comprised of a hollow cylindrical metal tube. The first pressure roller 81B and the second pressure roller 82B are each comprised of a cylindrical metal core and an elastic layer of rubber or the like provided on an outer peripheral surface thereof. The first heater 81C is a member for heating the first heating roller 81A. The second heater 82C is a member for heating the second heating roller 82A. The first heater 81A and the second heater 82C are, for example, halogen lamps. The first heater 81C is arranged to extend inside the first heating roller 81A. The second heater 82C is arranged to extend inside the second heating roller 82A.

The first heating roller 81A and the first pressure roller 81B are arranged to face each other and to be pressed one against the other. The first pressure roller 81B is driven to rotate when a driving force is input from a motor (not shown), and thereby causes the first heating roller 81A to rotate. The first heating roller 81A and the first pressure roller 81B are capable of conveying a sheet S sandwiched therebetween as the first pressure roller 81B is driven to rotate.

The second heating roller 82A and the second pressure roller 82B are arranged to face each other and to be pressed one against the other. The second pressure roller 82B is driven to rotate when a driving force is input from the motor, and thereby causes the second heating roller 82A to rotate. The second heating roller 82A and the second pressure roller 82B are capable of conveying a sheet S and a multilayer film F sandwiched therebetween as the second pressure roller 82B is driven to rotate.

In one example, a distance from the first heating unit 81 to the second heating unit 82, specifically, the distance from a nip region between the first heating roller 81A and the first pressure roller 81B to a nip region between the second heating roller 82A and the second pressure roller 82B is shorter than a (lengthwise) length of an A4 size sheet S in a direction of conveyance of the sheet S.

Figure 2:
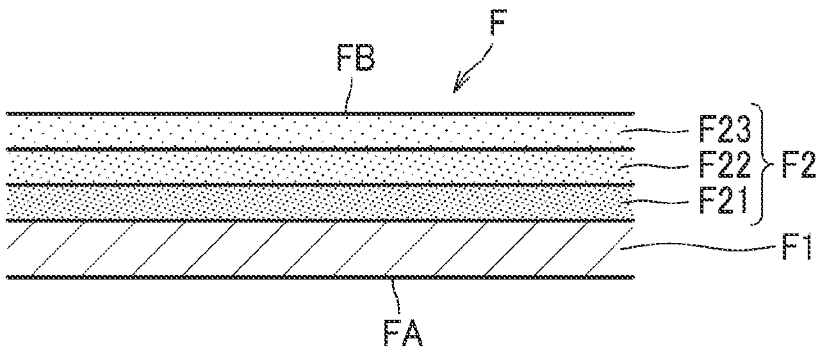
FIG. 2 is a cross-sectional view showing a configuration of a multilayer film.

As shown in FIG. 2, the multilayer film F is a film comprised of a plurality of layers and includes a transfer layer F22 and a supporting layer F1. More specifically, the multilayer film F includes the supporting layer F1 and a supported layer F2. The supported layer F2 includes, for example, a release layer F21, the transfer layer F22, and an adhesive layer F23.

The supporting layer F1 is a transparent substrate in the form of a tape made of resin and supports the supported layer F2 including the transfer layer F22.

The release layer F21 is a layer for facilitating separation of the transfer layer F22 from the supporting layer F1, and is interposed between the supporting layer F1 and the transfer layer F22. The release layer F21 contains a transparent material, such as a wax-type resin, easily releasable from the supporting layer F1.

The transfer layer F22 is a layer to be transferred onto a toner image on a sheet S, and contains foil. Foil is a thin sheet of metal such as gold, silver, copper, aluminum, etc. The transfer layer F22 contains a colorant of gold-colored, silver-colored, red-colored, or other colored material, and a thermoplastic resin. The transfer layer F22 is interposed between the release layer F21 and the adhesive layer F23.

The adhesive layer F23 is a layer for facilitating adhesion of the transfer layer F22 to a toner image. The adhesive layer F23 contains a material such as vinyl chloride resin or acrylic resin, which tends to adhere to a toner image.

Referring back to FIG. 1, the image forming apparatus 1 further comprises a supply reel 83A, a take-up reel 83B, a first guide roller 83C, and a second guide roller 83D.

The supply reel 83A is a reel for supplying the multilayer film F, and the take-up reel 83B is a reel for taking up the multilayer film F. The multilayer film F is wound on the supply reel 83A and the take-up reel 83B. One end of the multilayer film F is fixed to the supply reel 83A and the other end of the multilayer film F is fixed to the take-up reel 83B. At first, the multilayer film F is wound on the supply reel 83A in a roll of a maximum diameter and on the take-up reel 83B in a roll of a minimum diameter. When the multilayer film F is exhausted, the multilayer film F is wound on the supply reel 83A in a roll of a minimum diameter and on the take-up reel 83B in a roll of a maximum diameter.

The take-up reel 83B is driven to rotate when a driving force is input from a motor (not shown). The multilayer film F wound on the supply reel 83A is drawn out from the supply reel 83A as the second heating roller 82A and the second pressure roller 82B rotate with the multilayer film F sandwiched therebetween. The multilayer film F drawn out from the supply reel 83A is guided by the first guide roller 83C and enters the nip region between the second heating roller 82A and the second pressure roller 82B. After passing through the nip region between the second heating roller 82A and the second pressure roller 82B, the multilayer film F is guided by the second guide roller 83D and is taken up on the take-up reel 83B driven to rotate.

The first guide roller 83C is a roller for changing the traveling direction of the multilayer film F drawn out from the supply reel 83A. The first guide roller 83C guides the multilayer film F drawn out from the supply reel 83A in such a manner that the multilayer film F is laid over a sheet S being conveyed with a surface having a toner image formed thereon facing upward. The multilayer film F and the sheet S overlaid on each other enter the nip region between the second heating roller 82A and the second pressure roller 82B.

The second guide roller 83D is a roller for changing the traveling direction of the multilayer film F guided by the first guide roller 83C. The second guide roller 83D changes a direction of conveyance of the multilayer film F that has passed through the nip region between the second heating roller 82A and the second pressure roller 82B to a direction different from a direction of conveyance of the sheet S to thereby guide the multilayer film F in a direction apart from the sheet S. That is, the second guide roller 83D peels the sheet S off from the multilayer film F that has passed through the nip region between the second heating roller 82A and the second pressure roller 82B.

The first surface FA (see FIG. 2) of the multilayer film F formed by the supporting layer F1 contacts the first guide roller 83C and the second guide roller 83D. The second surface FB (see FIG. 2) of the multilayer film F contacts the surface of the sheet S on which the toner image is formed. The second surface FB is the surface opposite the first surface FA and is formed by the supported layer F2 including the transfer layer F22.

The multilayer film F may be replaceable, for example, included in a cartridge installable into and removable from the housing 10. Alternatively, the multilayer film F may not be replaceable. If the multilayer film F is not replaceable, the image forming apparatus 1 may be replaced with a new one when the multilayer film F is exhausted.

The image forming apparatus 1 further comprises a separation mechanism 85. For example, the separation mechanism 85 is a mechanism for moving the second heating roller 82A and the multilayer film F between a contact position shown by a solid line, and a separated position shown by a chain double-dashed line. The contact position is a position in which the second heating roller 82A contacts the first surface FA of the multilayer film F and the second pressure roller 82B contacts the second surface FB of the multilayer film F. The separated position is a position in which the second heating roller 82A and the multilayer film F are separated apart from the second pressure roller 82B. The separation mechanism 85 is controlled by the controller 2.

The ejection unit 90 is a unit for ejecting a sheet S to the outside of the housing 10. The ejection unit 90 comprises an ejection roller 91. The ejection roller 91 is a roller for ejecting a sheet S conveyed from the heating unit 80 onto the output tray 13 outside of the housing 10.

The first conveyance path 110 is a path formed in the housing 10 for guiding a sheet S through the process unit 30 to the heating unit 80. The first conveyance path 110 extends rearward from the first feeder roller 21 to the ejection roller 91. The sheet S guided by the first conveyance path 110 passes through between the photosensitive drums 51 and the transfer rollers 74, through between the first heating roller 81A and the first pressure roller 81B, and through between the second heating roller 82A and the second pressure roller 82B.

The second conveyance path 120 is a path formed in the housing 10 for guiding a sheet S to the heating unit 80 by a route not passing through the process unit 30. The second conveyance path 120 is connected to the first conveyance path 110 at a location downstream of the process unit 30 in a direction of conveyance of a sheet S in the first conveyance path 110. In more detail, the second conveyance path 120 extends rearward under the process unit 30 from the vicinity of the second feeder roller 22, and is connected to the first conveyance path 110 at a location between the first heating unit 81 and the second heating unit 82 in the direction of conveyance of the sheet S in the first conveyance path 110. The sheet S guided by the second conveyance path 120 is conveyed by the conveyor rollers 23, and passes through between the second heating roller 82A and the second pressure roller 82B.

The operation unit 3 is a unit operable by a user. The operation unit 3 may be configured, for example, to display on a touch panel provided on the housing 10 buttons operable by a user including a first button for selecting a first printing mode, a second button for selecting a second printing mode, and a third button for selecting a third printing mode. Alternatively, the operation unit 3 may be configured as push buttons provided on the housing 10 which are operable by a user and include a first push button for selecting the first printing mode, a second push button for selecting the second printing mode, and a third push button for selecting the third printing mode.

The controller 2 is a device for controlling operations of the image forming apparatus 1. The controller 2 comprises a CPU, a ROM, a RAM, an input/output unit, etc., and executes stored programs in order to execute various processes. The controller 2 can perform a printing process to form an image on a sheet S in response to receipt of a printing command or an operation by a user.

The controller 2 is capable of operating in a first printing mode, a second printing mode, and a third printing mode. The first printing mode is a printing mode in which a sheet S is subjected to all the processes consisting of the process of transferring a toner image executed at the process unit 30, the process of fixing the toner image executed at the first heating unit 81, and the process of transferring the transfer layer executed at the second heating unit 82. The second printing mode is a printing mode in which a sheet S is not subjected to the process of transferring a toner image as executed at the process unit 30 and the process of fixing the toner image as executed at the first heating unit 81, but is subjected to the process of transferring the transfer layer executed at the second heating unit 82. The third printing mode is a printing mode in which a sheet S is subjected to the process of transferring a toner image executed at the process unit 30 and the process of fixing the toner image executed at the first heating unit 81, but is not subjected to the process of transferring the transfer layer as executed at the second heating unit 82.

The first printing mode and the second printing mode are modes in which an image including a toner image and a transfer layer is formed on a sheet S. The third printing mode is a printing mode in which an image only including a toner image is formed on a sheet S.

In the first printing mode and the second printing mode, the controller 2 controls the separation mechanism 85 to cause the second heating roller 82A and the multilayer film F to move toward the second pressure roller 82B and bring the multilayer film F into contact with the second pressure roller 82B. In the third printing mode, the controller 2 controls the separation mechanism 85 to cause the second heating roller 82A and the multilayer film F to move apart from the second pressure roller 82B. Further, in the second printing mode, the controller 2 does not cause the process unit 30 and the first heating unit 81 to operate and leaves these units at rest.

In the first printing mode and the third printing mode, the controller 2 causes a sheet S to be guided to the heating unit 80 by the first conveyance path 110. In more detail, the controller 2 causes the first feeder roller 21 to feed a sheet S on the first feed tray 11 into the housing 10, and then causes the sheet S to be guided by the first conveyance path 110 through the process unit 30 to the heating unit 80, specifically, to the first heating unit 81 and then to the second heating unit 82.

In the second printing mode, the controller 2 causes a sheet S to be guided to the heating unit 80 by the second conveyance path 120. In more detail, the controller 2 causes the second feeder roller 22 to feed a sheet S on the second feed tray 12 into the housing 10, and then causes the sheet S to be guided by the second conveyance path 120 to the second heating unit 82 of the heating unit 80, without following a route passing through the process unit 30 and the first heating unit 81.

The controller 2 determines a printing mode according to information input by the user at the operation unit 3. Alternatively, if the user operates an external device D such as a personal computer connected to the image forming apparatus 1 by wired or wireless communication to select the printing mode, the controller 2 determines the printing mode according to information received from the external device D. If the user operates the operation unit 3 or the external device D, the controller 2 determines, the first printing mode as the printing mode if the first printing mode is selected, determines the second printing mode as the printing mode if the second printing mode is selected, and determines the third printing mode as the printing mode if the third printing mode is selected.

The controller 2 is configured to cause the first heating unit 81 to apply an amount of heat to a toner image transferred onto a sheet S in the first printing mode, and to cause the first heating unit 81 to apply an amount of heat to a toner image transferred onto a sheet S in the third printing mode. The amount of heat applied in the first printing mode is smaller than that applied in the third printing mode. Here, the amount of heat is defined as the amount of heat applied per unit area of a sheet S.

Specifically, the controller 2 sets a target temperature TT1 of the first heating unit 81 in the first printing mode at a temperature lower than in the third printing mode. For example, as shown in FIG. 3, the controller 2 sets the target temperature TT1 of the first heating unit 81 at 160° C. in the first printing mode and at 180° C. in the third printing mode.

Further, the controller 2 is configured to cause the second heating unit 82 to apply an amount of heat to a toner image formed on a sheet S in the first printing mode, and to cause the second heating unit 82 to apply an amount of heat to a toner image formed on a sheet S in the second printing mode. The amount of heat applied in the first printing mode is smaller than that applied in the second printing mode. Specifically, the controller 2 sets a target temperature TT2 of the second heating unit 82 in the first printing mode at a temperature lower than in the second printing mode. For example, the controller 2 sets the target temperature TT2 of the second heating unit 82 at 130° C. in the first printing mode and at 150° C. in the second printing mode.

When a toner image is fixed at the first heating unit 81 onto a sheet of paper thicker than a sheet of so-called "plain paper", such as an envelope, cardboard, etc. (hereinafter referred to as "thick paper"), the controller 2 causes the first heating unit 81 to apply an amount of heat, to the toner image formed on thick paper, greater than an amount of heat applied to a toner image formed on plain paper. Specifically, the controller 2 sets the target temperature TT1 of the first heating unit 81 for fixing a toner image onto thick paper at a temperature higher than that for fixing a toner image onto plain paper.

In one example, for fixing a toner image onto thick paper in the first printing mode, the controller 2 sets the target temperature TT1 of the first heating unit 81 at 170° C. higher than an initial value of 160° C. for fixing a toner image onto plain paper. Further, for fixing a toner image onto thick paper in the third printing mode, the controller 2 sets the target temperature TT1 of the first heating unit 81 at 190° C. higher than an initial value of 180° C. for fixing a toner image onto plain paper. In this example, thick paper corresponds to "first sheet", and plain paper corresponds to "second sheet".

When the transfer layer is transferred at the second heating unit 82 onto a toner image formed on thick paper, the controller 2 causes the second heating unit 82 to apply an amount of heat, to the toner image formed on thick paper, greater than an amount of heat applied to a toner image formed on plain paper. Specifically, the controller 2 sets the target temperature TT2 of the second heating unit 82 for transferring the transfer layer onto the toner image formed on thick paper at a temperature higher than that for transferring the transfer layer onto the toner image formed on plain paper.

In one example, for transferring the transfer layer onto a toner image formed on thick paper in the first printing mode, the controller 2 sets the target temperature TT2 of the second heating unit 82 at 150° C. higher than an initial value of 130° C. for transferring the transfer layer onto a toner image formed on plain paper. Further, for transferring the transfer layer onto a toner image formed on thick paper in the second printing mode, the controller 2 sets the target temperature TT2 of the second heating unit 82 at 170° C. higher than an initial value of 150° C. for transferring the transfer layer onto a toner image formed on plain paper.

The operation unit 3 can be operated in the second printing mode to change the amount of heat to be applied to the toner image formed on the sheet S by the second heating unit 82 to a first amount of heat or to a second amount of heat greater than the first amount of heat. When the amount of heat to be applied to the toner image formed on the sheet S by the second heating unit 82 is changed according to information input at the operation unit 3, the controller 2 causes the second heating unit 82 to apply the second amount of heat to the toner image formed on the sheet S in the second printing mode.

Specifically, the operation unit 3 can be operated to change the target temperature TT2 of the second heating unit 82 to a preset first target temperature or to a preset second target temperature higher than the first target temperature. In order to allow such operation, the operation unit 3 may be configured, for example, to display on the touch panel a button operable by a user for changing the target temperature TT2 of the second heating unit 82 to the second target temperature. Alternatively, the operation unit 3 may be configured to include a push button on the housing 10 operable by a user for changing the target temperature TT2.

When the target temperature TT2 of the second heating unit 82 is changed to the second target temperature according to information input at the operation unit 3, the controller 2 sets, in the second printing mode, the target temperature TT2 of the second heating unit 82 at the second target temperature. In one example, if an operation to change the target temperature TT2 is performed when printing on plain paper, the controller 2 sets, in the second printing mode, the target temperature TT2 of the second heating unit 82 at a second target temperature of 170° C. higher than a first target temperature of 150° C. If an operation to change the target temperature TT2 is performed when printing on thick paper, the controller 2 sets, in the second printing mode, the target temperature TT2 of the second heating unit 82 at a second target temperature of 190° C. higher than a first target temperature of 170° C.

Next, an example of a process executed by the controller 2 while power to the image forming apparatus 1 is on will be described with reference to a flowchart of FIG. 4. When the image forming apparatus 1 is in a standby state waiting to receive a print command, the second heating roller 82A and the multilayer film F are in a separated position apart from the second pressure roller 82B (see the chain double-dashed line in FIG. 1).

Figure 4:
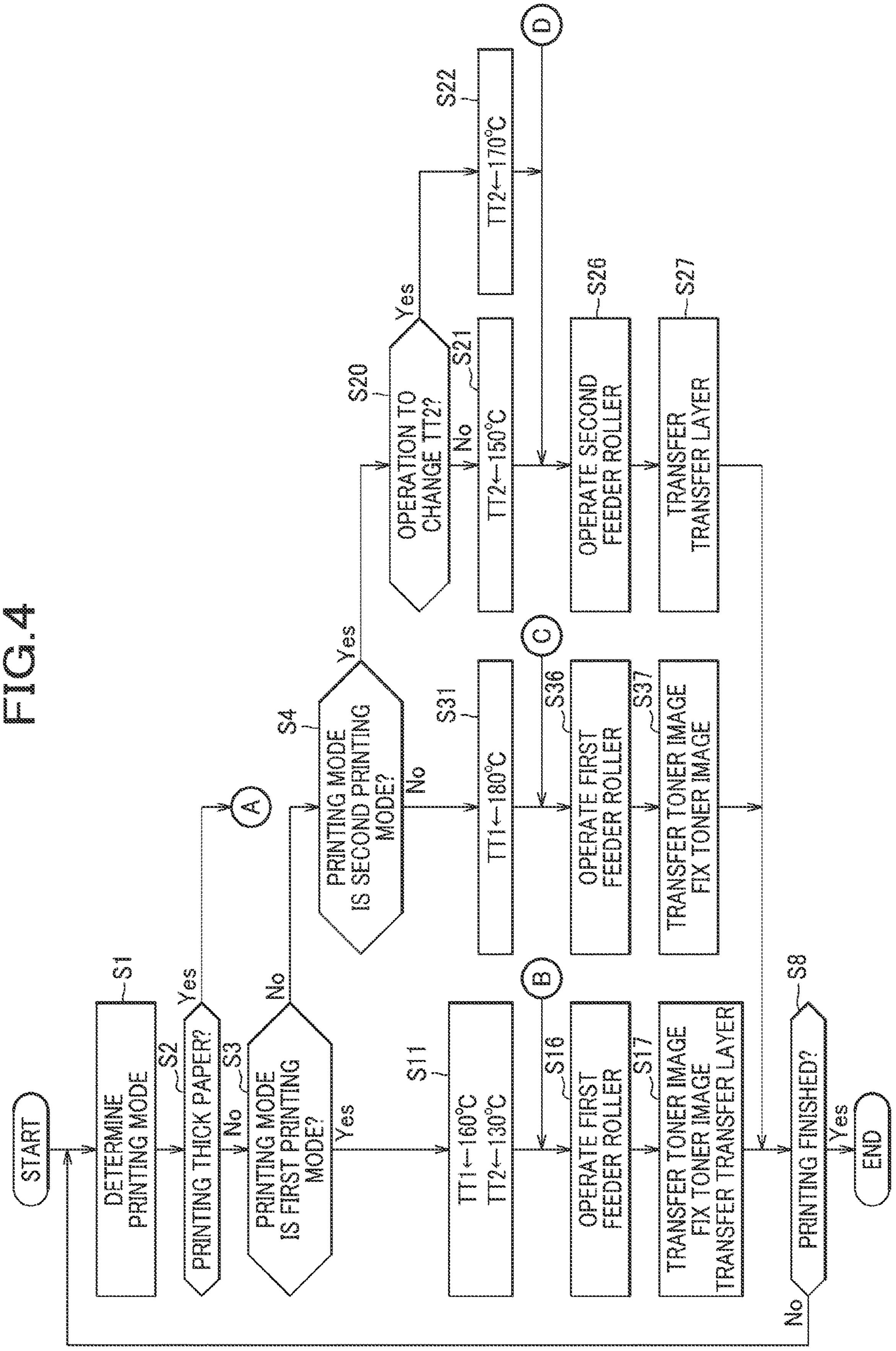
FIG. 4 is a flowchart showing an example of a process executed by a controller.

As shown in FIG. 4, upon receipt of a print command, the controller 2 determines a printing mode according to information input by the user operating the operation unit 3 or the external device D (S1). The controller 2 also determines whether or not thick paper is to be being printed (S2).

If plain paper rather than thick paper is to be printed (S2, No), the controller 2 determines whether or not the printing mode is the first printing mode (S3).

If the printing mode is the first printing mode (S3, Yes), the controller 2 sets the target temperature TT1 of the first heating unit 81 at 160° C. and the target temperature TT2 of the second heating unit 82 at 130° C. (S11).

Subsequently, the controller 2 operates the first feeder roller 21 to feed a sheet S on the first feed tray 11 into the housing 10 (S16), transfers a toner image at the process unit 30, fixes the toner image at the first heating unit 81, and transfers the transfer layer on the sheet S at the second heating unit 82 (S17). Before transferring the transfer layer on the sheet S at the second heating unit 82, the controller 2 controls the separation mechanism 85 to move the second heating roller 82A and the multilayer film F from the separated position to the contact position.

Thereafter, the controller 2 determines whether or not printing is finished (S8), and if not (S8, No), returns to step S1, and if so (S8, Yes), ends the process. When printing is finished, the controller 2 controls the separation mechanism 85 to move the second heating roller 82A and the multilayer film F from the contact position to the separated position.

If the printing mode is not the first printing mode in step S3 (S3, No), the controller 2 determines whether or not the printing mode is the second printing mode (S4).

If the printing mode is not the second printing mode (S4, No), the printing mode is the third printing mode. Thus, the controller 2 sets the target temperature TT1 of the first heating unit 81 at 180° C. (S31).

Subsequently, the controller 2 operates the first feeder roller 21 to feed a sheet S on the first feed tray 11 into the housing 10 (S36), transfers a toner image at the process unit 30, and fixes the toner image on the sheet S at the first heating unit 81 (S37). In the third printing mode, the controller 2 keeps the second heating roller 82A and the multilayer film F in the separated position. In this case, the controller 2 may turn the second heater 82C off, or turn the second heater 82C on with the target temperature TT2 set at a temperature lower than that set for transferring the transfer layer. Then, the controller 2 executes the process of step S8.

If the printing mode is the second printing mode in step S4 (S4, Yes), the controller 2 determines whether or not an operation has been performed to change the target temperature TT2 of the second heating unit 82 from the first target temperature to the second target temperature (S20). If an operation to change the target temperature TT2 has not been performed (S20, No), the target temperature TT2 is set at the first target temperature of 150° C. (S21), and if an operation to change the target temperature TT2 has been performed (S20, Yes), the target temperature TT2 is set at the second target temperature of 170° C. (S22).

Subsequently, the controller 2 operates the second feeder roller 22 to feed a sheet S on the second feed tray 12 into the housing 10 (S26), and transfers the transfer layer onto the sheet S at the second heating unit 82 (S27). Before transferring the transfer layer onto the sheet S at the second heating unit 82, the controller 2 controls the separation mechanism 85 to move the second heating roller 82A and the multilayer film F from the separated position to the contact position. Further, in the second printing mode, the controller 2 does not cause the process unit 30 and the first heating unit 81 to operate and leaves these units at rest. In this case, the controller 2 may turn the first heater 81C off, or turn the first heater 81C on with the target temperature TT1 set at a temperature lower than that set for fixing a toner image.

Thereafter, the controller 2 executes the process of step S8. When printing is finished, the controller 2 controls the separation mechanism 85 to move the second heating roller 82A and the multilayer film F from the contact position to the separated position.

Figure 5:
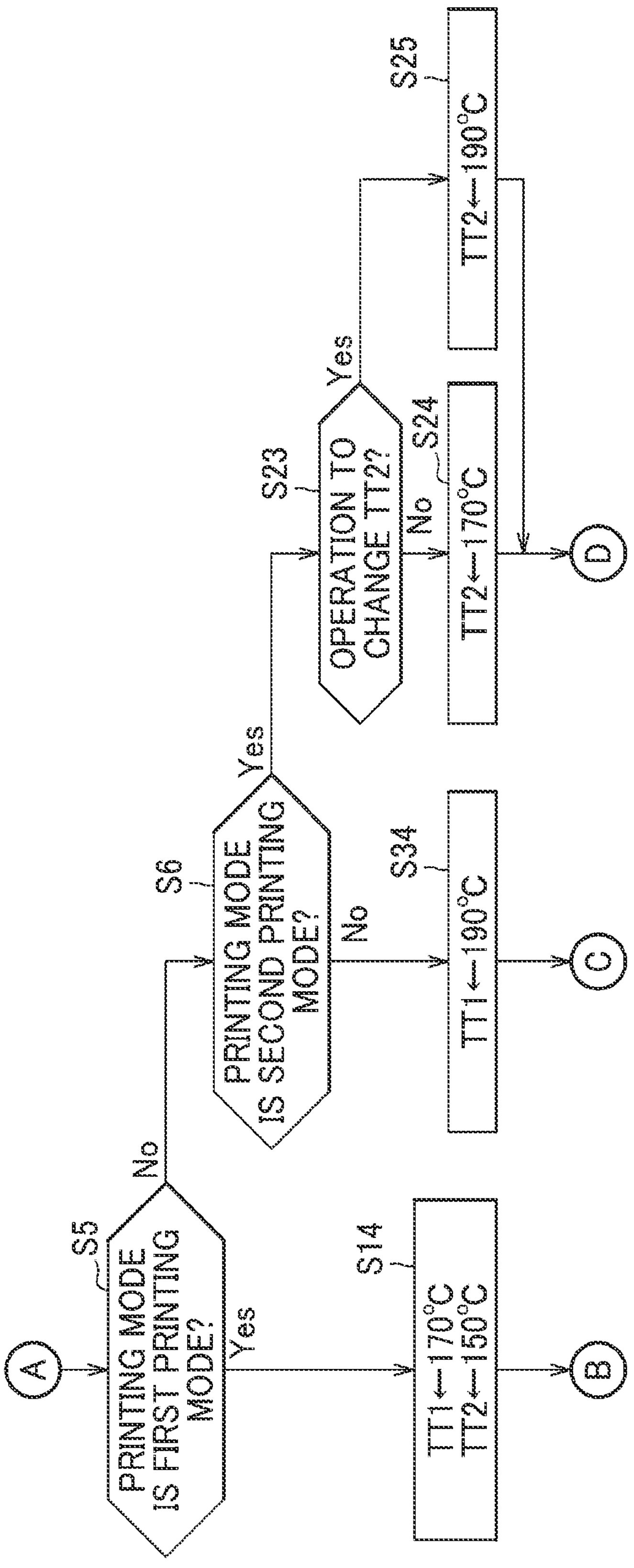
FIG. 5 is a flowchart showing another example of a process executed by the controller.

When thick paper is printed in step S2 (S2, Yes), the controller 2 determines, as shown in FIG. 5, whether or not the printing mode is the first printing mode (S5).

If the printing mode is the first printing mode (S5, Yes), the controller 2 sets the target temperature TT1 of the first heating unit 81 at 170° C., and sets the target temperature TT2 of the second heating unit 82 at 150° C. (S14). Then, the controller 2 executes the process of step S16 shown in FIG. 4.

If the printing mode is not the first printing mode in step S5 shown in FIG. 5 (S5, No), the controller 2 determines whether or not the printing mode is the second printing mode (S6).

If the printing mode is the third printing mode (S6, No), the controller 2 sets the target temperature TT1 of the first heating unit 81 at 190° C. (S34). Then, the controller 2 executes the process of step S36 shown in FIG. 4.

If the printing mode is the second printing mode in step S6 shown in FIG. 5 (S6, Yes), the controller 2 determines whether or not an operation to change the target temperature TT2 of the second heating unit 82 has been performed (S23). If such operation has not been performed (S23, No), the controller 2 sets the target temperature TT2 at the first target temperature of 170° C. (S24), and if such operation has been performed (S23, Yes), the controller 2 sets the target temperature TT2 at the second target temperature of 190° C. (S25) and then performs the process of step S26 shown in FIG. 4.

According to the example described above, by guiding a sheet S from the first feed tray 11 to the heating unit 80 by the first conveyance path 110 in the first printing mode, the processes of transferring and fixing a toner image and transferring the transfer layer onto the sheet S can be executed. Further, by guiding a sheet S from the second feed tray 12 to the second heating unit 82 by the second conveyance path 120 in the second printing mode, a sheet S having a toner image formed thereon by another image forming apparatus can be subjected to the process of transferring the transfer layer onto the toner image formed thereon by the another image forming apparatus without executing a preliminary process of forming a toner image on the sheet S.

Since, in the second printing mode in which the transfer layer is transferred onto a sheet S, the sheet S is guided to the heating unit 80 by the second conveyance path 120 and does not pass through the process unit 30, the process unit 30 can be kept at rest in this mode.

Since the second conveyance path 120 is connected to the first conveyance path 110 at the location between the first heating unit 81 and the second heating unit 82, in the second printing mode in which a sheet S is guided to the second heating unit 82 by the second conveyance path 120 and the transfer layer is transferred onto the sheet S, the sheet S does not pass through the first heating unit 81. Thus, the first heating unit 81 can be kept at rest in this mode.

Since the heating unit 80 comprises the first heating unit 81 and the second heating unit 82 as individual units, a fixing condition of a toner image at the first heating unit 81 and a transfer condition of the transfer layer at the second heating unit 82, such as the target temperatures TT1, TT2, can be set individually.

Since an amount of heat applied to a toner image on a sheet S by the second heating unit 82 in the first printing mode is smaller than an amount of heat applied to a toner image on a sheet S by the second heating unit 82 in the second printing mode, reliability of transferring the transfer layer on a toner image on a sheet S can be kept sufficiently high.

Specifically, in the first printing mode, since heating a sheet S at the second heating unit 82 associated with transfer of the transfer layer is performed after heating the sheet S at the first heating unit 81 associated with fixing of a toner image, and the amount of heat applied to a toner image on the sheet S by the second heating unit 82 in the first printing mode is smaller than that in the second printing mode, excess heating of the sheet S can be restrained when the transfer layer is transferred. If the sheet is excessively heated when the transfer layer is transferred, the peelability of the sheet from the multilayer film may be deteriorated causing reliability of transferring the transfer layer to decrease. Since excessive heating of the sheet S can be restrained when the transfer layer is transferred, reliability of transferring the transfer layer can be kept sufficiently high.

Looking at it the other way around, since the transfer layer is transferred onto a sheet S at the second heating unit 82 without executing a process of heating the sheet S in the first heating unit 81 in the second printing mode, the amount of heat necessary to transfer the transfer layer can be ensured by applying an amount of heat greater than that applied in the first printing mode to a toner image on a sheet S by the heating unit 82. In this way, reliability of transferring the transfer layer on a toner image on a sheet S can be kept sufficiently high.

Since a target temperature TT2 of the second heating unit 82 in the first printing mode is set at a temperature lower than that set in the second printing mode, power consumption in the first printing mode can be reduced compared to when the target temperatures in the first printing mode and the second printing mode are set at the same temperature.

Since it takes time for a thick sheet to heat up, when the sheet S is thick (when printing is performed on thick paper), the amount of heat necessary for transferring the transfer layer onto a toner image on the sheet S can be ensured by increasing an amount of heat applied to the toner image on the sheet S by the second heating unit 82. In this way, reliability of transferring the transfer layer can be kept sufficiently high.

Since the user can operate the operation unit to change an amount of heat applied to a toner image on a sheet S by the second heating unit 82 to a second amount of heat greater than a first amount of heat, reliability of transferring the transfer layer on a toner image formed on a sheet S by another imaging device can be kept sufficiently high.

In addition to the above, toner of the toner image formed on the sheet S by another image forming apparatus may have properties different from those of toner used in the image forming apparatus 1. In such a case, if an amount of heat applied to the toner image on the sheet S by the second heating unit 82 is a first amount of heat, reliability of transferring the transfer layer may decrease. In this example, since the target temperature TT2 of the second heating unit 82 can be changed to a higher second target temperature, reliability of transferring the transfer layer on a toner image formed on a sheet S by another image forming apparatus can be maintained.

Since the controller is configured to be capable of operating in a third printing mode, an image consisting solely of a toner image and not having a transfer layer transferred thereon can be formed on a sheet S in the third printing mode.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the following description, the same components as those of the above example are identified by the same reference characters and explanation thereof is omitted.

In the above-described example, the target temperature TT2 of the second heating unit 82 is changed to make the amount of heat applied to the toner image on the sheet S by the second heating unit 82 in the first printing mode smaller than that in the second printing mode. However, for example, a conveyance speed of a sheet S at the second heating unit may be changed, instead, for the same purpose. In one example, instead of changing the target temperature of the second heating unit, a sheet S may be conveyed at a speed at the second heating unit in the first printing mode faster than that in the second printing mode to make the amount of heat applied to the toner image on the sheet S by the second heating unit smaller. It is to be understood that the image forming apparatus may not have a function of changing an amount of heat applied to a toner image on a sheet S by the second heating unit according to the printing mode.

In the above-described example, the target temperatures TT1, TT2 are set at higher temperatures according to a thickness of a sheet S when thick paper is printed. However, the target temperature may be changed according to the temperature or humidity of the environment in which the image forming apparatus is located. For example, when a temperature of an environment in which the image forming apparatus is located is low, for example, equal to or below a predetermined temperature, the target temperature may be set at a temperature higher than a target temperature set when the temperature of the environment in which the image forming apparatus is located is above a predetermined temperature. It is to be understood that the image forming apparatus may not have a function of changing an amount of heat applied to a sheet S according to a thickness of the sheet S or temperature.

Although the image forming apparatus 1 has a function of changing an amount of heat applied to a toner image on a sheet S by the second heating unit 82 in response to a user's operation in the second printing mode, the image forming apparatus 1 may not necessarily have such function.

In the above-described example, the controller 2 is configured to determine a printing mode according to information input by a user operating the operation unit 3 or an external device D. However, the controller 2 may be configured to operate in the first printing mode when a sheet S is loaded on the first feed tray 11, and to operate in the second printing mode when a sheet S is loaded on the second feed tray 12.

Although the second conveyance path 120 is connected to the first conveyance path 110 at a location between the first heating unit 81 and the second heating unit 82 in the above-described example, the second conveyance path may, for example, be connected to the first conveyance path 110 at a location between the process unit 30 and the first heating unit 81.

Figure 6:
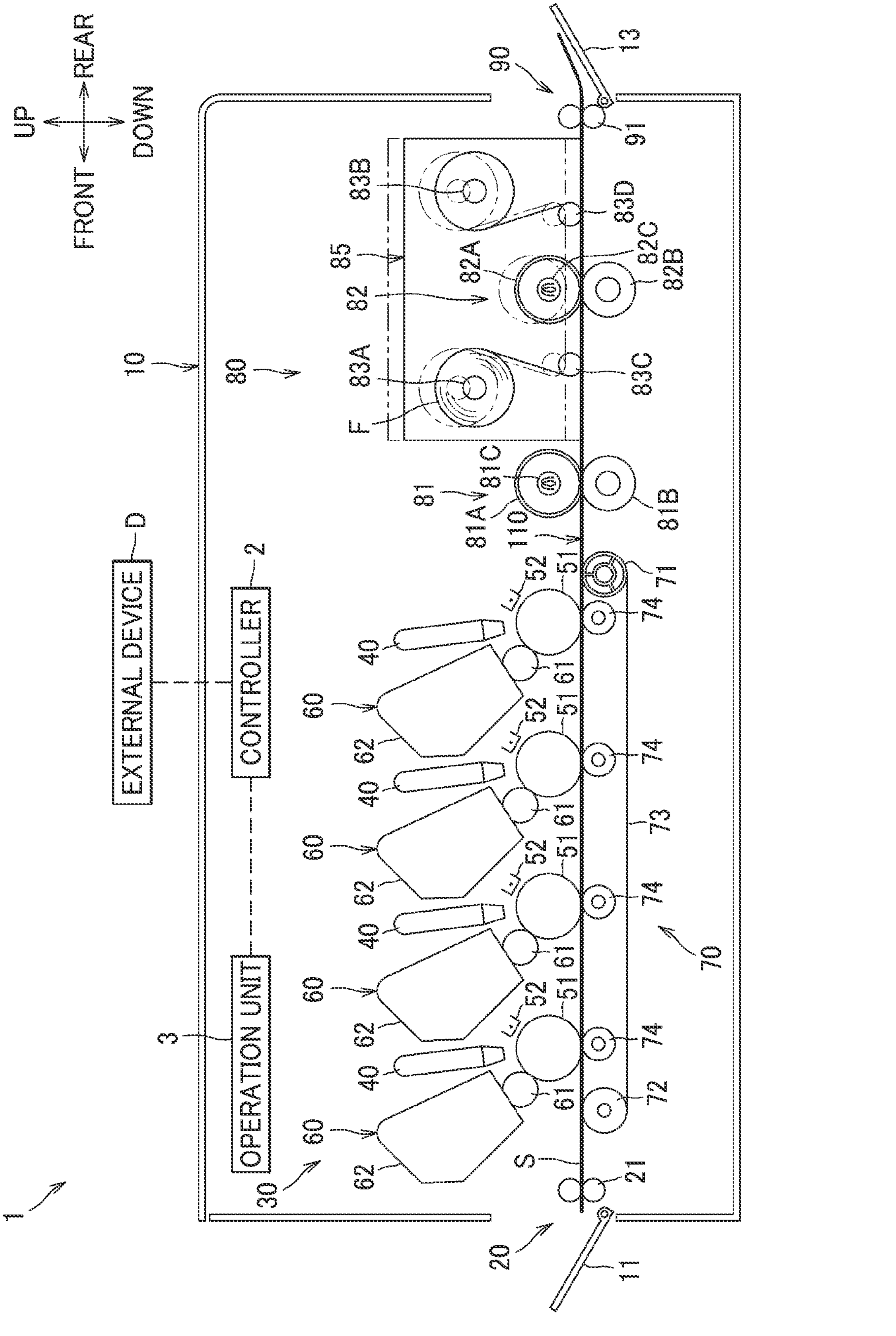
FIG. 6 is an illustration showing a modified configuration of the image forming apparatus.

Further, as shown in FIG. 6, the image forming apparatus 1 may not comprise a second conveyance path and may only comprise the first conveyance path 110. In this case, the controller 2 causes a sheet S to be guided to the heating unit 80 by the first conveyance path 110 when operating in the first printing mode, the second printing mode, or the third printing mode. Specifically, the controller 2 causes a sheet S on the first supply tray 11 to be fed into the housing 10 by the first feeder roller 21, and guided through the process unit 30 to the heating unit 80 by the first conveyance path 110. According to this configuration, a common conveyance path can be used which makes it possible to downsize the image forming apparatus 1.

In the image forming apparatus 1 shown in FIG. 6 operated in the first printing mode, similar to the above-described example, a toner image is transferred at the process unit 30 onto a sheet S fed from the first feed tray 11 and fixed on the sheet S at the first heating unit 81, and after the second heating roller 82A and the multilayer film F is moved to the contact position, the transfer layer is transferred at the second heating unit 82.

When the image forming apparatus 1 is operated in the second printing mode, the process unit 30 and the first heating unit 81 are operated to convey a sheet S fed from the first feed tray 11 to the second heating unit 82, and the transfer layer is transferred onto the sheet S at the second heating unit 82 with the second heating roller 82A and the multilayer film F moved to the contact position. In this case, the controller 2 turns the first heater 81C off, and does not execute the processes of transferring and fixing a toner image onto a sheet S. It is to be understood that the image forming apparatus 1 may comprise a mechanism for moving the development roller 61 between a position in which the development roller 61 contacts a corresponding photosensitive drum 51 and a position in which the development roller 61 is separated apart from the corresponding photosensitive drum 51, and the controller 2 may be configured to separate the development roller 61 apart from the photosensitive drum 51 in the second printing mode.

When the image forming apparatus 1 is operated in the third printing mode, similar to the above-described example, a toner image is transferred at the process unit 30 onto a sheet S fed from the first feed tray 11 and fixed on the sheet S at the first heating unit 81. In this case, the controller 2 causes the second heating roller 82A and the multilayer film F to be positioned in the separated position and does not execute a process of transferring the transfer layer onto the sheet S. Further, in this case, the controller 2 may turn off the second heater 82C, or turn on the second heater 82C with a target temperature set at a temperature lower than that set for transferring the transfer layer.

Although the image forming apparatus 1 is configured to be capable of operating in the third printing mode in which an image only including a toner image is formed on a sheet S, the image forming apparatus 1 may not be configured to operate in the third printing mode. In other words, the image forming apparatus may be configured to form an image including both of a toner image and a transfer layer.

Figure 7:
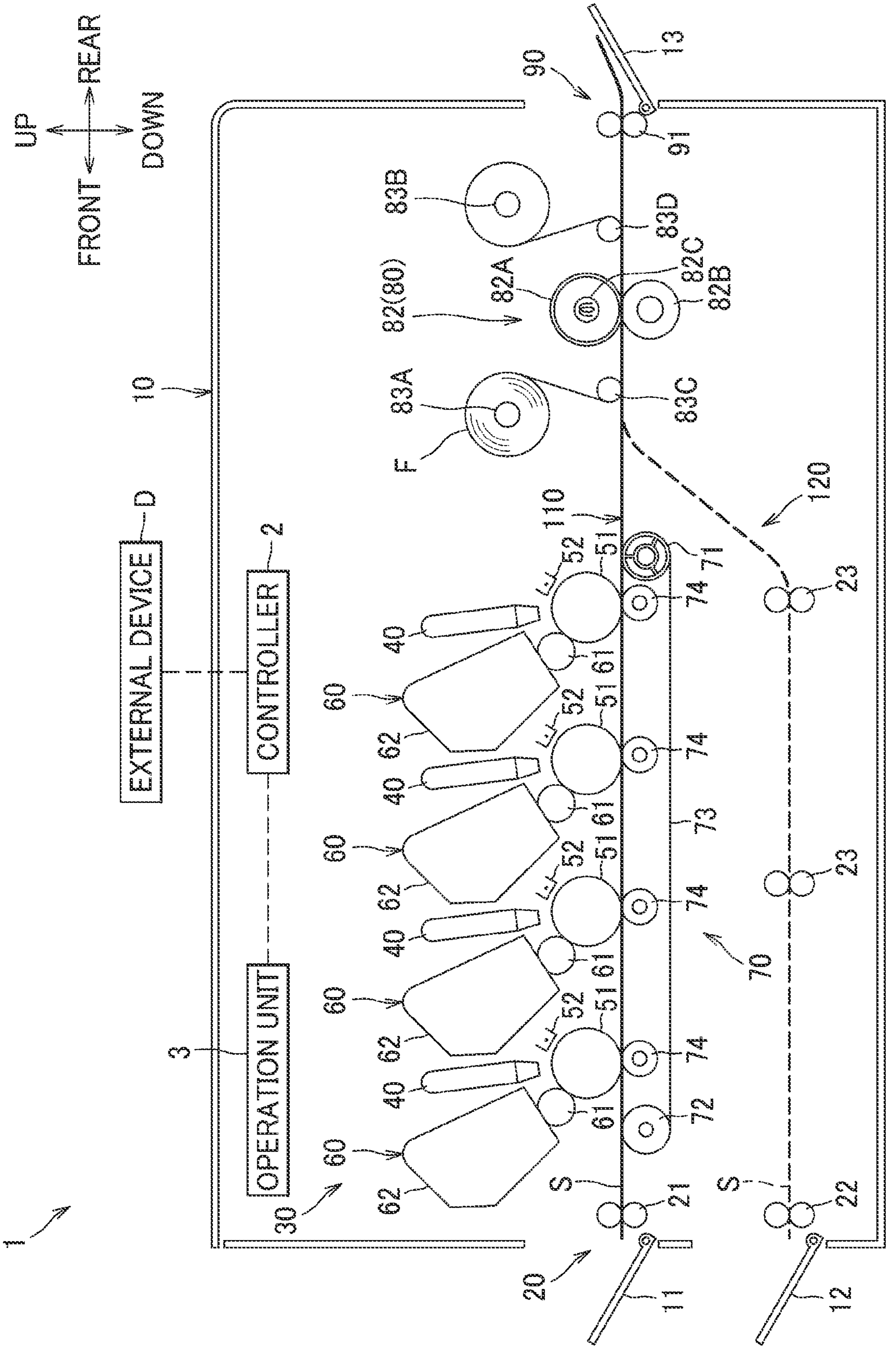
FIG. 7 is an illustration showing another modified configuration of the image forming apparatus.

In the above-described example, the heating unit 80 comprises a first heating unit 81 and a second heating unit 82. However, for example as shown in FIG. 7, the image forming apparatus 1 may comprise only the second heating unit 82 as the heating unit 80, and may be configured to fix a toner image transferred onto a sheet S at the process unit 30, and to transfer the transfer layer of the multilayer film F onto the toner image on the sheet S at the heating unit 80. In other words, the heating unit 80 may be configured to perform the processes of fixing a toner image and transferring the transfer layer at the same time. In this way, the heating unit 80 can be downsized which makes it possible to downsize the image forming apparatus 1.

The configuration of the process unit 30 in the above-described example is one example. For example, the process unit may be configured to comprise, instead of the exposure unit 40, an exposure device that comprises a laser light source, a polygon mirror, lenses, reflectors, etc., and to scan a surface of a photosensitive drum with a laser light to expose the surface of the photosensitive drum. The number of photosensitive drums 51 may not necessarily be 4, but may be 1, 2, 3, 5 or more. If the number of photosensitive drums is 1, the process unit may not comprise a transfer unit 70 including a transfer belt 73, and may be configured to comprise only one transfer roller. The process unit may also be configured to comprise a photoconductor other than the photosensitive drum, for example, a photosensitive belt or other photosensitive member. Further, the process unit may not be configured to transfer a toner image from the photosensitive drum 51 directly onto a sheet S, but may be configured to transfer a toner image from the photosensitive drum onto a sheet S by way of an intermediate transfer belt.

Although the heating unit 80 comprises heating rollers 81A, 82A, and pressure rollers 81B, 82B in the above-described example, the heating unit may comprise, for example, heating section(s) including endless belt(s) instead of the heating rollers 81A, 82A. The heating unit may also comprise heating section(s) including endless belt(s), pressure pad(s), etc., instead of the pressure rollers 81B, 82B. The heaters 81C, 82C are not limited to halogen lamps but may be ceramic heaters, carbon heaters, IH heaters or the like. The heaters may be positioned outside, not inside, the heating rollers.

Although the transfer layer F22 containing foil is given as an example in the above-described example, the transfer layer may, for example, not include foil or colorant and may be formed of a thermoplastic resin. Further, although the multilayer film F is comprised of 4 layers in the above-described example, the multilayer film F may comprise any number of layers as long as it includes the transfer layer and the supporting layer.

The image forming apparatus may comprise a document reader such as a flatbed scanner.

The elements described in the above example embodiments and its modified examples may be implemented selectively and in combination.

What is claimed is:

1. An image forming apparatus with a capability of transferring, from a multilayer film including a transfer layer and a supporting layer that supports the transfer layer, the transfer layer onto an image formed on a sheet, the image forming apparatus comprising:

a process unit configured to transfer an image onto a sheet;

a heating unit configured to fix the image transferred at the process unit onto the sheet, and to transfer the transfer layer onto an image formed on a sheet overlaid on the multilayer film; and a controller unit, wherein, the controller unit is configured to be capable of operating in:

a first printing mode in which processes of transferring an image at the process unit, fixing the image at the heating unit, and transferring the transfer layer at the heating unit are executed; and a second printing mode in which processes of transferring an image at the process unit and fixing an image at the heating unit are not executed, and a process of transferring the transfer layer at the heating unit is executed.

2. The image forming apparatus according to claim 1, further comprising a conveyance path configured to guide a sheet through the process unit to the heating unit, wherein the controller unit is configured to cause a sheet to be guided to the heating unit by the conveyance path in both of the first printing mode and the second printing mode.

3. The image forming apparatus according to claim 1, further comprising:

a first conveyance path configured to guide a sheet through the process unit to the heating unit; and a second conveyance path connected to the first conveyance path at a location downstream of the process unit in a direction of conveyance of a sheet to guide a sheet to the heating unit by a route not passing through the process unit, wherein the controller unit is configured to:

cause a sheet to be guided to the heating unit by the first conveyance path in the first printing mode; and cause a sheet to be guided to the heating unit by the second conveyance path in the second printing mode.

4. The image forming apparatus according to claim 3, wherein the heating unit comprises:

a first heating unit configured to fix the image transferred onto the sheet at the process unit; and a second heating unit located downstream of the first heating unit in the direction of conveyance to transfer the transfer layer onto an image on a sheet, wherein the second conveyance path is connected to the first conveyance path at a location between the first heating unit and the second heating unit in the direction of conveyance.

5. The image forming apparatus according to claim 4, wherein an amount of heat applied to the image on the sheet by the second heating unit in the first printing mode is smaller than an amount of heat applied to the image on the sheet by the second heating unit in the second printing mode.

6. The image forming apparatus according to claim 5, wherein the controller unit is configured to set a target temperature of the second heating unit in the first printing mode at a temperature lower than a target temperature of the second heating unit in the second printing mode.

7. The image forming apparatus according to claim 5, wherein when the transfer layer is transferred onto an image formed on a first sheet thicker than a second sheet, the controller unit is configured to cause the second heating unit to apply to the first sheet an amount of heat greater than an amount of heat applied to the second sheet when the transfer layer is transferred onto an image formed on the second sheet.

8. The image forming apparatus according to claim 5, further comprising an operation unit operable by a user to change an amount of heat to be applied to the image on the sheet by the second heating unit to a first amount of heat or to a second amount of heat greater than the first amount of heat, wherein the controller unit is configured, in the second printing mode, to cause the second heating unit to apply the second amount of heat to the image on the sheet, if the amount of heat to be applied to the image on the sheet by the second heating unit is changed to the second amount of heat according to information input at the operation unit.

9. The image forming apparatus according to claim 1, wherein the heating unit comprises:

a first heating unit configured to fix the image transferred onto the sheet at the process unit; and a second heating unit located downstream of the first heating unit in a direction of conveyance of a sheet to transfer the transfer layer onto an image on a sheet.

10. The image forming apparatus according to claim 1, wherein the controller unit is configured to be capable of operating in a third printing mode in which processes of transferring an image onto a sheet at the process unit and fixing the image onto the sheet at the heating unit are executed, and a process of transferring the transfer layer onto the sheet at the heating unit is not executed.

11. The image forming apparatus according to claim 1, further comprising an operation unit operable by a user to select a printing mode, wherein the controller unit is configured to determine the printing mode according to information input at the operation unit.

12. The image forming apparatus according to claim 1, wherein the controller unit is configured to determine a printing mode according to information received from an external device connected to the image forming apparatus when a user operates the external device and selects the printing mode.

13. An image forming apparatus with a capability of transferring, from a multilayer film including a transfer layer and a supporting layer that supports the transfer layer, the transfer layer onto an image formed on a sheet, the image forming apparatus comprising:

a process unit configured to transfer an image onto a sheet;

a heating unit configured to fix the image transferred at the process unit onto the sheet, and to transfer the transfer layer onto an image formed on a sheet overlaid on the multilayer film;

a first conveyance path configured to guide a sheet through the process unit to the heating unit; and a second conveyance path connected to the first conveyance path at a location downstream of the process unit in a direction of conveyance of a sheet to guide a sheet to the heating unit by a route not passing through the process unit.

14. The image forming apparatus according to claim 13, wherein the heating unit comprises:

a first heating unit configured to fix the image transferred onto the sheet at the process unit; and a second heating unit located downstream of the first heating unit in the direction of conveyance to transfer the transfer layer onto an image on a sheet, and wherein the second conveyance path is connected to the first conveyance path at a location between the first heating unit and the second heating unit in the direction of conveyance.

15. An image forming apparatus with a capability of transferring, from a multilayer film including a transfer layer and a supporting layer that supports the transfer layer, the transfer layer onto an image formed on a sheet, the image forming apparatus comprising:

a process unit configured to form an image on a sheet;

a fixing unit configured to fix the image formed at the process unit onto the sheet, a layer transfer unit configured to transfer the transfer layer onto an image formed on a sheet overlaid on the multilayer film; and a controller unit, wherein, the controller unit is configured to be capable of operating in:

a first printing mode in which processes of forming an image at the process unit, fixing the image at the fixing unit, and transferring the transfer layer at the layer transfer unit are executed; and a second printing mode in which processes of forming an image at the process unit and fixing an image at the fixing unit are not executed, and a process of transferring the transfer layer at the layer transfer unit is executed.

16. The image forming apparatus according to claim 15, further comprising a conveyance path configured to guide a sheet through the process unit and the fixing unit to the layer transfer unit, wherein the controller unit is configured to cause a sheet to be guided to the layer transfer unit by the conveyance path in both of the first printing mode and the second printing mode.

17. The image forming apparatus according to claim 15, further comprising:

a first conveyance path configured to guide a sheet through the process unit and the fixing unit to the layer transfer unit; and a second conveyance path connected to the first conveyance path at a location downstream of the process unit in a direction of conveyance of a sheet to guide a sheet to the layer transfer unit by a route not passing through the process unit and the fixing unit, wherein the controller unit is configured to:

cause a sheet to be guided to the layer transfer unit by the first conveyance path in the first printing mode; and cause a sheet to be guided to the layer transfer unit by the second conveyance path in the second printing mode.

18. The image forming apparatus according to claim 15, wherein the layer transfer unit is located downstream of the fixing unit in a direction of conveyance of a sheet.

19. The image forming apparatus according to claim 15, wherein the controller unit is configured to be capable of operating in a third printing mode in which processes of forming an image onto a sheet at the process unit and fixing the image onto the sheet at the fixing unit are executed, and a process of transferring the transfer layer onto the sheet at the layer transfer unit is not executed.

20. The image forming apparatus according to claim 15, further comprising an operation unit operable by a user to select a printing mode, wherein the controller unit is configured to determine the printing mode according to information input at the operation unit.

21. The image forming apparatus according to claim 15, wherein the controller unit is configured to determine a printing mode according to information received from an external device connected to the image forming apparatus when a user operates the external device and selects the printing mode.

22. An image forming apparatus with a capability of transferring, from a multilayer film including a transfer layer and a supporting layer that supports the transfer layer, the transfer layer onto an image formed on a sheet, the image forming apparatus comprising:

a process unit configured to form an image on a sheet;

a fixing unit configured to fix the image formed at the process unit onto the sheet, a layer transfer unit configured to transfer the transfer layer onto an image formed on a sheet overlaid on the multilayer film;

a first conveyance path configured to guide a sheet through the process unit and the fixing unit to the layer transfer unit; and a second conveyance path connected to the first conveyance path at a location downstream of the process unit in a direction of conveyance of a sheet to guide a sheet to the layer transfer unit by a route not passing through the process unit and the fixing unit.

23. The image forming apparatus according to claim 22, wherein the layer transfer unit is located downstream of the fixing unit in the direction of conveyance, and wherein the second conveyance path is connected to the first conveyance path at a location between the fixing unit and the layer transfer unit in the direction of conveyance.

24. An image forming apparatus comprising:

a photosensitive drum configured to form an image on a sheet;

a fuser configured to fix the image formed by the photosensitive drum onto the sheet, a layer transfer roller configured to transfer a transfer layer onto an image formed on a sheet overlaid on a multilayer film including the transfer layer; and a controller, wherein, the controller is configured to execute:

a first printing mode in which the photosensitive drum forms an image, the fuser fixes the image, and the layer transfer roller transfers the transfer layer onto the image; and a second printing mode in which the photosensitive drum does not form an image, the fuser does not fix an image, and the layer transfer roller transfers the transfer layer onto an image.

25. The image forming apparatus according to claim 24, further comprising a conveyance path configured to guide a sheet through the photosensitive drum and the fuser to the layer transfer roller, wherein the controller is configured to cause a sheet to be guided to the layer transfer roller by the conveyance path in both of the first printing mode and the second printing mode.

26. The image forming apparatus according to claim 24, further comprising:

a first conveyance path configured to guide a sheet through the photosensitive drum and the fuser to the layer transfer roller; and a second conveyance path connected to the first conveyance path at a location downstream of the photosensitive drum in a direction of conveyance of a sheet to guide a sheet to the layer transfer roller by a route not passing through the photosensitive drum and the fuser, wherein the controller is configured to:

cause a sheet to be guided to the layer transfer roller by the first conveyance path in the first printing mode; and cause a sheet to be guided to the layer transfer roller by the second conveyance path in the second printing mode.

27. The image forming apparatus according to claim 26, wherein the layer transfer roller is located downstream of the fuser in the direction of conveyance, and wherein the second conveyance path is connected to the first conveyance path at a location between the fuser and the layer transfer roller in the direction of conveyance.

28. The image forming apparatus according to claim 24, wherein the layer transfer roller is located downstream of the fuser in a direction of conveyance of a sheet.

29. The image forming apparatus according to claim 24, wherein the controller is configured to operate in a third printing mode in which the photosensitive drum forms an image, the fuser fixes the image, and the layer transfer roller does not transfer the transfer layer.

30. The image forming apparatus according to claim 24, further comprising an operation unit operable by a user to select a printing mode, wherein the controller is configured to determine the printing mode according to information input at the operation unit.

31. The image forming apparatus according to claim 24, wherein the controller is configured to determine a printing mode according to information received from an external device connected to the image forming apparatus when a user operates the external device and selects the printing mode.

* * * * *